Dec. 16, 1930. E. G. DUDEN 1,784,892
FLUID TREATING APPARATUS
Filed April 30, 1927 3 Sheets-Sheet 1

INVENTOR
Emil G. Duden
By Green and McAllister
His Attorneys

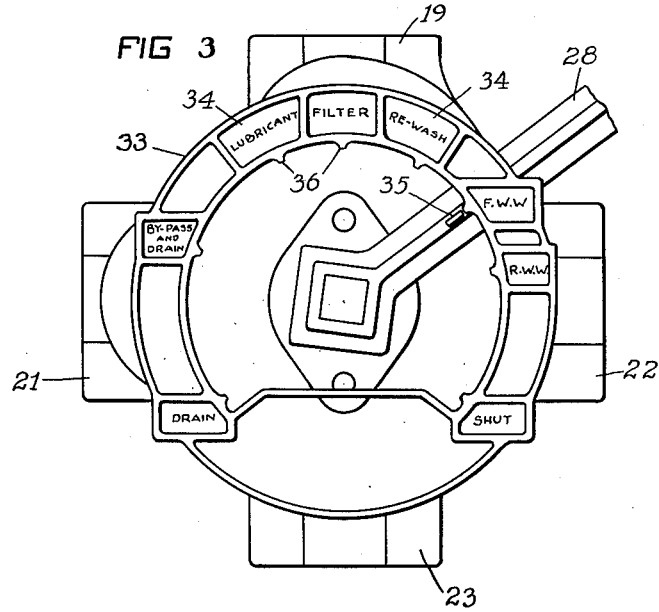
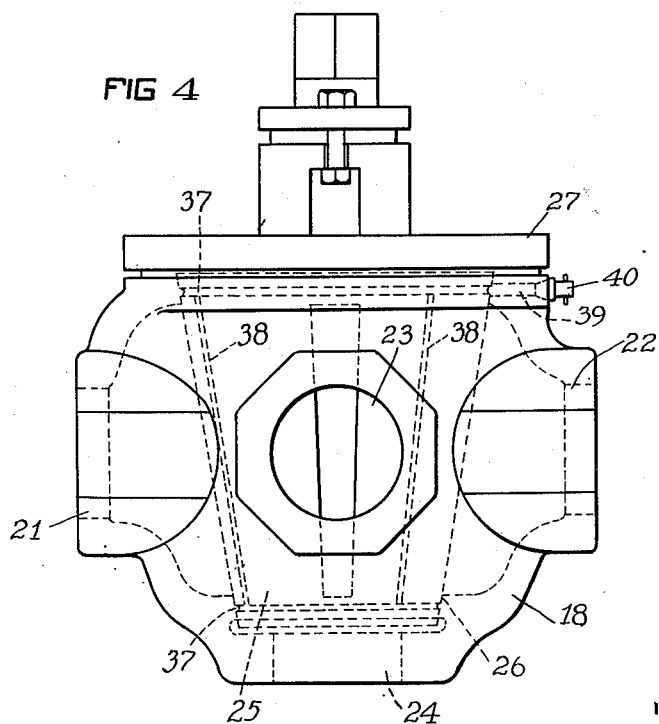

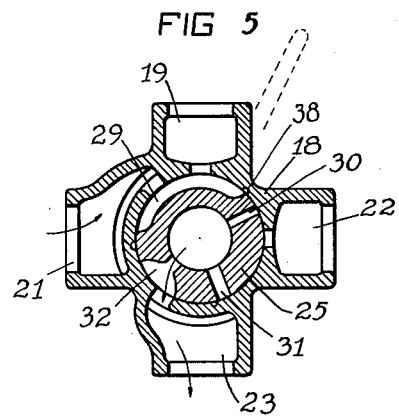
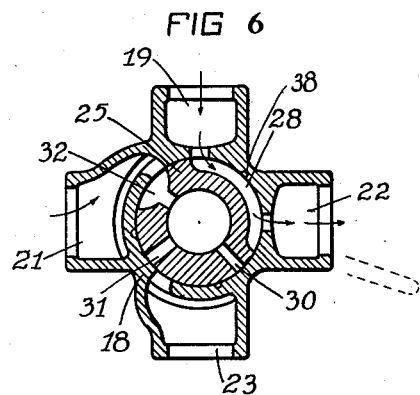
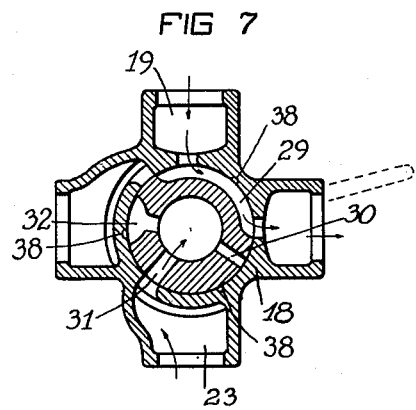
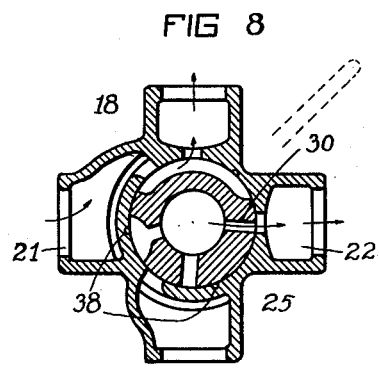
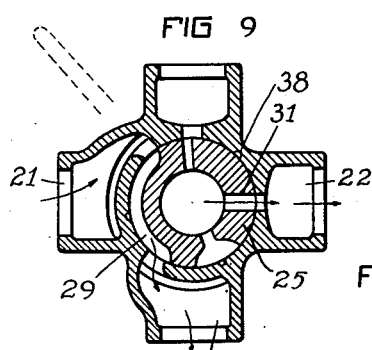
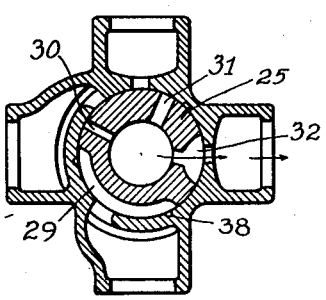
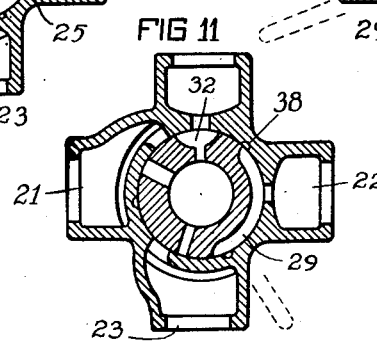

Patented Dec. 16, 1930

1,784,892

UNITED STATES PATENT OFFICE

EMIL G. DUDEN, OF OAKMONT, PENNSYLVANIA, ASSIGNOR TO WM. B. SCAIFE & SONS CO., A CORPORATION OF PENNSYLVANIA

FLUID-TREATING APPARATUS

Application filed April 30, 1927. Serial No. 187,768.

This invention relates to fluid treating apparatus and more particularly to water filters, softeners and the like.

Devices of this type generally include a tank or treating chamber containing material through which the fluid, such as water, is passed for the purpose of purifying, softening or otherwise affecting it. An inlet manifold in the top of the chamber is connected by outside piping to a supply line and a drain manifold in the bottom of the chamber is also connected with outside piping communicating with a waste or sewer connection and also with a line for conveying the treated water to the desired point of storage or consumption.

The piping arrangement and the connections are such that a predetermined flow can be obtained by the manipulation of suitably arranged valves associated with the piping. For example, water from the supply line can be fed into the chamber through the inlet manifold from the top thereof, through the treating agent within the chamber into the drain manifold at the bottom and thence out to the point of consumption or storage. In the case of filters the filter bed is cleaned by washing the material of the bed with water fed through the chamber in a direction opposite to the direction of flow during filtering. The wash water is admitted through the manifold in the bottom, passes upwardly through the material and out through the manifold at the top, the piping connection of which has been placed in communication with the sewer outlet for the purpose of discharging the wash water. Other connections are possible as is well known in the art, but in order to obtain the desired arrangements it has hitherto been necessary to employ a relatively large number of valves for controlling and operating such connections.

An object of this invention is to provide a mechanism of the type set forth wherein a single control is employed for obtaining any desired operation of the apparatus.

A further object is to provide a device of the type set forth of such construction and arrangement as to eliminate all necessity for the complicated valve arrangements heretofore used.

A still further object is to provide an improved form of valve for use in connection with fluid treating apparatus.

A still further object is to provide an arrangement of the type set forth which will be simple and cheap to manufacture, rugged in construction and easy and positive in operation.

Figure 1:
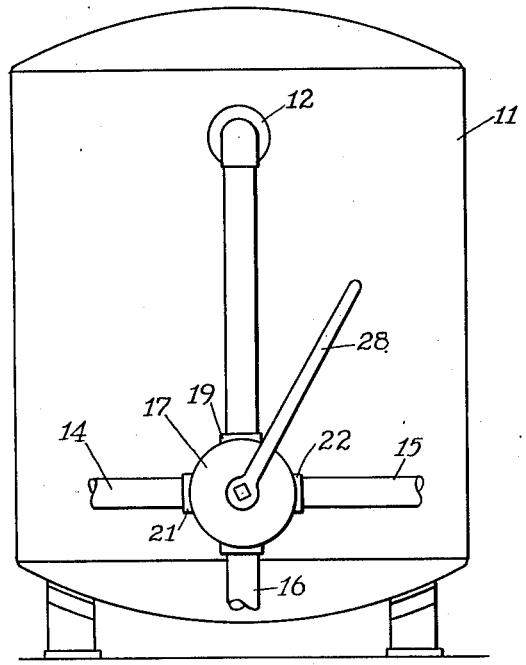
Figure 2:
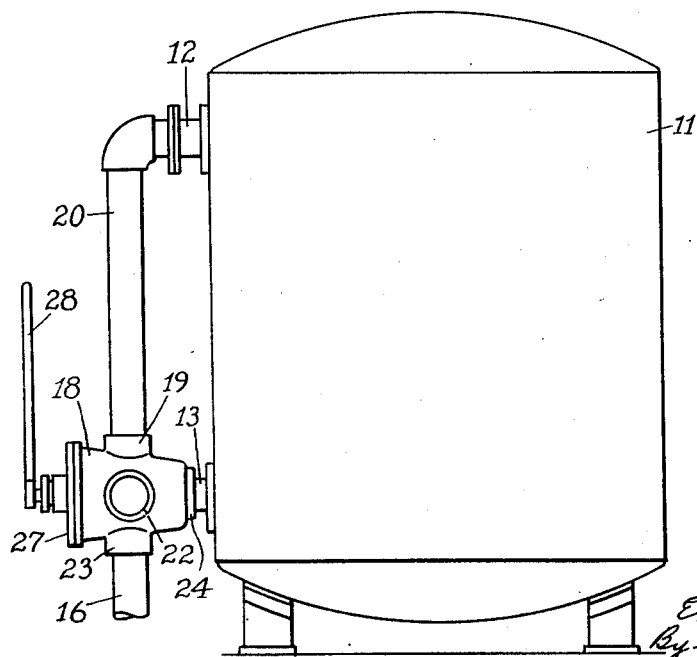

These and other objects which will be apparent to those skilled in this particular art are accomplished by means of the invention illustrated in the accompanying drawings, in which Figure 1 is a front elevation of a water treating tank or chamber provided with a single control valve constructed in accordance with one form of this invention. Fig. 2 is a similar view taken from the right of Fig. 1. Fig. 3 is a view in elevation of the valve casing forming a part of the present invention showing the valve plug operating handle and quadrant. Fig. 4 is a similar view of the valve casing or body from another angle and Figs. 5 to 11 are sectional views through the interior of a control valve constructed in accordance with one form of this invention.

The particular embodiment of this invention which has been chosen for the purposes of illustration is hereinafter referred to as a water filter, but this is done for the purpose of description only and without any limiting effect. It will be readily understood by those skilled in the art that this invention is equally applicable to other forms of water treating apparatus.

As illustrated, this invention includes a water treating chamber or filter tank 11 having an inlet connection 12 leading to a manifold in the top of the tank and an outlet connection 13 communicating with a drain manifold in the bottom of the tank. A supply line 14 is associated with the apparatus together with a waste connection 15 leading to an associated sewer and also a connection 16 for conveying the filtered or other treated water to the desired point of consumption or storage.

In order to so control the water as to cause the desired flow thereof with relation to the filter tank, it has been the common practice heretofore to employ separate valves with each of the various pipe connections and additional valves and piping when it was desired to provide a by-pass connection for permitting the water to be by-passed around the filter. The present invention provides a construction of apparatus of such arrangement that a single controlling valve is sufficient to produce any desired flow of water or to shut off all flow entirely.

As illustrated, this single control valve 17 is in the form of a five-way valve having a more or less circular casing or body 18 with four circumferentially spaced ports formed therein. When positioned, as illustrated in the drawings, the port 19 at the top of the casing is connected with the tank inlet 12 by an associated pipe 20. The port 21 at one side of the casing is connected to the raw water supply line 14; the port 22 on the opposite side of the casing is connected to the sewer connecting pipe 15 and the port 23 in the bottom of the valve casing is connected with the outlet pipe 16 for filtered water. The valve body has a hollow tapered bore, the small or tapered end of which terminates in a fifth port 24 is formed in the back of the valve casing and is connected to the drain outlet 13 from the bottom of the tank.

A hollow valve body or plug 25 rotatably mounted within the tapered bore of the casing 18 for the purpose of establishing the desired flow through the valve with relation to the associated filter and this plug is of conical shape for engaging a conically formed seat 26 within the casing. A valve cover 27 secures the plug in place and the plug is adapted to be rotated by an operating handle 28 of usual construction. The hollow interior of the valve plug communicates directly with the port 24 in the back of the casing which in turn is connected to the manifold at the bottom of the filter tank. The outer surface of the plug is provided with an elongated groove 29 forming a water passage between certain of the ports in the valve casing when desired. The plug also has three ports 30, 31 and 32, the latter of which is bell-shaped and all of which extend from the outer face thereof to the hollow interior to provide water passages between the circumferentially spaced ports of the valve body and the interior of the valve plug.

It will be apparent that any desired type of flow of the water with relation to the filter tank is obtainable by the proper manipulation of the five-way valve when associated with suitable piping such as is illustrated. The valve cover is provided with a quadrant 33 bearing legends 34 which enable the valve handle and plug to be placed in the desired position. The handle is provided with a mark or lug 35 for cooperating with similar marks or lugs 36 on the quadrant for indicating the position of the valve plug.

The outer face of the valve plug has an annular groove 37 formed adjacent each end and the valve casing has grooves 38 which connect the annular grooves in the plug when the latter is positioned in the casing. These grooves constitute lubricant channels for conveying lubricant to the face of the valve plug. A bore 39 extends from the outer face of the casing to one of the annular grooves 37 and a suitable connection 40 such, for example, as an alemite or pressure lubricant fitting is positioned in the mouth of the bore so that lubricant may be forced into the grooves by the usual pressure gun.

The operation will be apparent from the above description. When the valve operating handle 28 is in the shut position the valve plug is positioned as shown in Fig. 11 and no flow of water takes place. When it is desired to filter the water the plug is moved to the filtering position illustrated in Fig. 5 and water then passes from the supply line 14 through the port 21 of the valve casing, through the passage 29, port 19 in the top of the casing and inlet 12 into the filter. The filtered water emerging through the connection 13 at the bottom of the filter passes to the interior of the hollow plug 25 through the port 24 in the back of the valve casing, thence through the bell shaped port 32 in the valve plug and port 23 of the valve casing to pipe 16 whence the filtered water is carried to some desired point.

When the filter bed has become clogged with dirt, or other matter removed from the water, it is washed by passing water upwardly through it in a direction opposite to that taken by water being filtered. This is accomplished by moving the valve plug to the position illustrated in Fig. 6 when it is desired to wash the filter with raw water from the water supply line. When the plug is in this position the raw water passes directly to the interior of the valve plug, thence through the port 24 at the back of the casing and into the bottom of the filter, thence upwardly through the filter whence it emerges through the connection 12 at the top thereof and passes downwardly through the port 19 in the top of the valve casing, thence through the passage 29 in the valve plug face and out through the port 22 to the sewer connecting pipe 15.

If, for any reason, it is desirable to wash the filter bed with filtered water instead of raw water the plug is turned to the position illustrated in Fig. 7 when the water flows in the direction shown by the arrows of this figure. The filtered water enters the valve casing through the port 23 and then passes through the port 31 of the plug to the interior thereof. It enters the bottom of the filter, passes upwardly therethrough so as to remove the dirt and sediment therefrom and then returns to the valve casing through the pipe 20 to the port 19, whence it flows through the passage 29 and port 22 to the sewer connecting pipe 15. When it is desired to subject the filter bed to a "re-wash", so called, the valve is positioned as illustrated in Fig. 8 and the flow of water is as shown by the arrows therein. The raw water enters through the port 21 which communicates with the port 19 and tank inlet 12 through the valve passage 29. The water leaving the tank through the bottom connection 13 flows through the port 30 from the interior of the valve plug to the sewer connecting pipe 15.

It is sometimes desirable to by-pass the raw water in the supply line 14 around the filter tank and cause it to flow through the pipe 16 without passing it through the filter. This is accomplished by positioning the valve plug as illustrated in Fig. 9 wherein the passage 29 causes the water in the supply pipe 14 to flow directly from the port 21 to the port 23 and thence through the pipe 16 without passing through the filter. The valve plug port 31 communicates with the port 22 and sewer connecting pipe 15 when the plug is in this position so that any water in the filter will drain off into the sewer.

When it is desired to drain the filter and at the same time shut off the flow of water through the supply line 14 the plug is positioned as shown in Fig. 10.

It will be apparent that the present invention provides a filter construction wherein a single control is employed for obtaining any desired flow of water with relation to the filter tank or for shutting off such flow altogether. No additional valves are required other than the single controlling valve and all operating conditions are obtainable by means of the single five-way valve without the necessity of any additional valves or bibbs.

Although I have described what is now looked upon as the preferred embodiment of this invention it will be apparent that various additions, substitutions, omissions and changes can be made in the specific details thereof without departing from the spirit of this invention or the scope of the appended claims.

What I claim as new and desire to secure by Letters Patent is:

1. A five way valve comprising a valve casing having four circumferentially spaced ports and an intermediate port, all for the passage of liquid, a valve plug operable within said casing having an intermediate passage formed therein and so located as to register with said intermediate port in all positions of the plug, and having three passages communicating with said intermediate passage and adapted to establish communication between said intermediate passage and one or two of said circumferential ports for different positions of the plug, and having a peripheral groove formed therein for successively establishing communication between any two adjacent circumferentially spaced ports as said plug is turned to one of four different positions.

2. A multi-way valve comprising a valve body having a tapered bore terminating in a port in the body at the small end of the bore, four circumferentially spaced ports formed in said body and extending radially from the bore, and a hollow tapered plug turnably mounted in the bore of the body, said plug having three passageways communicating with the interior of the plug and adapted to establish communication between the bore port and one or two of said circumferentially spaced ports for different positions of the plug, said passageways being approximately equally spaced over half the circumference of the plug, and a passageway formed at the periphery of said plug, said latter passageway extending over substantially the other half of the circumference of the plug, and providing direct communication between any two adjacent circumferentially spaced ports of the body when the plug is turned to one of four different positions.

In testimony whereof, I have hereunto subscribed my name this 25th day of April, 1927.

EMIL G. DUDEN.

CERTIFICATE OF CORRECTION.

Patent No. 1,784,892.  Granted December 16, 1930, to

EMIL G. DUDEN.

It is hereby certified that error appears in the printed specification of the above numbered patent requiring correction as follows: Page 2, line 30, strike out the word "is"; line 31, after the word "valve" insert the words body or; line 33, strike out the words "body or" and after the numeral "25" insert the word is; and that the said Letters Patent should be read with these corrections therein that the same may conform to the record of the case in the Patent Office.

Signed and sealed this 3rd day of February, A. D. 1931.

(Seal)

M. J. Moore,
Acting Commissioner of Patents.